(12) United States Patent  
Richard et al.

(10) Patent No.: US 7,213,668 B2  
(45) Date of Patent: May 8, 2007

(54) SLIDING AIR-BOX

(75) Inventors: Karl Richard, Rock-Forest (CA); Andre Gauthier, St-Theodore d'Acton (CA); Dany Bernier, Rock Forest (CA)

(73) Assignee: Bombardier Recreational Products Inc., Valcourt (CA)

( * ) Notice: Subject to any disclaimer, the term of this patent is extended or adjusted under 35 U.S.C. 154(b) by 139 days.

(21) Appl. No.: 11/041,803

(22) Filed: Jan. 22, 2005

(65) Prior Publication Data

US 2006/0162974 A1   Jul. 27, 2006

(51) Int. Cl.
  *B60K 13/02* (2006.01)
(52) U.S. Cl. .................. 180/68.3; 180/68.1; 180/190
(58) Field of Classification Search .......... 180/68.1, 180/68.2, 68.3, 190, 9.1
  See application file for complete search history.

(56) References Cited

U.S. PATENT DOCUMENTS

| | | | | |
|---|---|---|---|---|
| 3,796,027 A | * | 3/1974 | Gumtow | 55/502 |
| 5,117,932 A | * | 6/1992 | Kurosu et al. | 180/68.2 |
| 5,152,255 A | * | 10/1992 | Fukuda | 123/41.33 |
| 5,174,258 A | * | 12/1992 | Tanaka | 123/198 E |
| 6,089,199 A | * | 7/2000 | Lohr et al. | 123/90.38 |
| 6,155,374 A | * | 12/2000 | Uchida | 180/309 |
| 6,263,850 B1 | * | 7/2001 | Winmill et al. | 123/184.21 |
| 6,561,297 B2 | * | 5/2003 | Yatagai et al. | 180/190 |
| 6,651,764 B2 | * | 11/2003 | Fournier et al. | 180/190 |
| 6,745,862 B2 | * | 6/2004 | Morii et al. | 180/296 |
| 6,866,694 B2 | * | 3/2005 | Moreau et al. | 55/385.3 |
| 6,880,659 B2 | * | 4/2005 | Yamamoto | 180/190 |
| 6,929,081 B2 | * | 8/2005 | Pichler et al. | 180/190 |
| 2004/0159482 A1 | * | 8/2004 | Eide | |

* cited by examiner

*Primary Examiner*—Christopher Bottorff
(74) *Attorney, Agent, or Firm*—Osler, Hoskin & Harcourt LLP

(57) ABSTRACT

A vehicle, such as a snowmobile, includes an engine with one or more air intakes for receiving air into the engine and an airbox for directing air into the air intakes. The airbox slides to facilitate installation and removal of the airbox from the engine compartment, which thus economizes time and cost both for vehicle assembly and maintenance. The sliding airbox also eliminates the need for a gap between the fuel tank and the airbox, allowing the fuel tank to be moved forward, thus improving mass centralization of the vehicle. The sliding airbox has a rectangular slot which slides onto a rectangular plate on an intake adapter. The intake adapter has a flexible tubular connection for each cylinder of the engine which are secured to each air intake with a hose clamp. The air intake usually includes an air metering device such as a carburetor or throttle body.

20 Claims, 11 Drawing Sheets

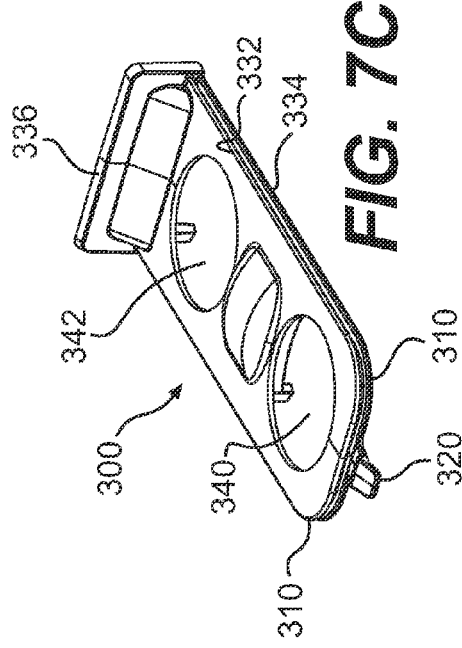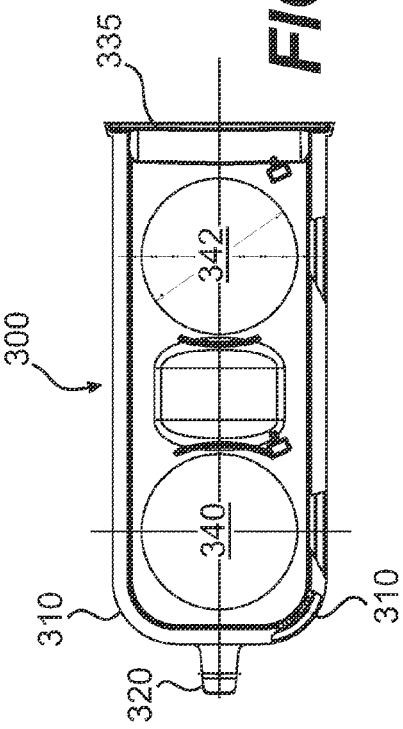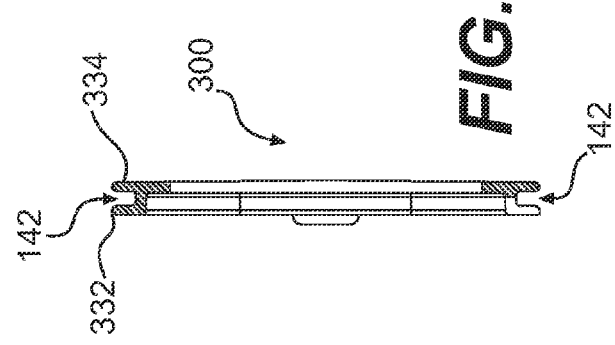

SLIDING AIR-BOX

FIELD OF THE INVENTION

The present invention generally relates to a land vehicle such as a snowmobile and, more particularly, to an airbox of such a land vehicle.

BACKGROUND OF THE INVENTION

FIG. 1 is a side view of an engine compartment 8 of a typical prior-art snowmobile 10. The engine compartment 8, located in a forward end 12 of the snowmobile 10, houses a front-mounted internal combustion engine 24 mounted to a frame 16 by at least one engine mount 24a. The engine 24 includes a crankshaft 24b driven inside a crankcase 24c by a piston reciprocating in at least one cylinder 24d. Air enters the engine via an airbox assembly 90 having an inlet 92 with a replaceable filter 94 leading to an air container 96 with an outlet in fluid communication with an air intake 25 of the engine 24. The air intake 25 typically includes an intake pipe 25a connected to a downstream carburetor 27 (or an air-regulating throttle body having a butterfly valve in the case of a fuel-injected engine). The carburetor may include an intake manifold 27a for connecting to an intake guide portion 24e of the engine. A gap G is provided beside the airbox assembly 90 to enable tool access for installation and removal of the airbox. As is known in the art, after each combustion cycle, the engine 24 exhausts through an exhaust manifold 29 and a muffler 29a. An exhaust valve drive motor 29b opens and closes an exhaust valve 29c.

FIG. 2 is an exploded perspective view of a conventional prior-art airbox assembly 90 having both a primary airbox 100 and a secondary airbox 200. The primary airbox (which hereinafter may also be referred to simply as an airbox) includes an air inlet 102 with a flanged mouth 103. The air inlet has a downwardly curving throat formed by mating upper and lower tubular shell portions 104a, 104b. An air container is formed by mating upper and lower box-like shell portions 106a, 106b integrally formed with the tubular shell portions 104a, 104b, all of which come together to form the primary airbox 100. The primary airbox 100 further includes an air outlet 108 having a pair of outlet ports (one for each cylinder) which are connected to carburetors or throttle bodies via respective flexible tubular connections 110.

As shown in FIG. 2, the primary airbox 100 is connected to the secondary airbox 200 for receiving air from the secondary airbox which, in turn, draws air from atmosphere. The secondary airbox includes first and second side-mating shell portions 202, 204 which come together to define an enclosure or air container. The second side-mating shell portion 204 includes an inlet 206 for drawing ambient air into the secondary airbox. A replaceable filter 208 (for obstructing particulate matter from entering and clogging up the airbox) spans across the inlet 206. The inlet 206 is in fluid communication with an admission tube 210 having an oblong mouth. Sound-insulating foam 212 is installed with the admission tube 210 to minimize engine noise. As shown in FIG. 2, the second side-mating shell portion 204 includes a circular outlet 214 which is in fluid communication with the inlet 102 of the primary airbox 100. The outlet 214 of the secondary airbox and the inlet 102 of the primary airbox connect via a conically-shaped guide discharge port 220 and a foam gasket 230. The guide discharge port facilitates alignment of the outlet 214 and inlet 102 while the foam gasket provides an airtight connection between the outlet 214 and the inlet 102.

For the purposes of this specification, the term "primary airbox" refers to the downstream airbox while "secondary airbox" refers to the upstream airbox. The terms "primary" and "secondary" are thus used arbitrarily. In other words, the primary airbox could equivalently be defined as the upstream airbox whereas the secondary airbox could be defined as the downstream airbox.

FIG. 3 is a side view showing the position of the (primary) airbox 100 relative to a fuel tank 70 when both components are affixed to a prior-art snowmobile. In this configuration, the inlet 102 is oriented substantially transversely to the longitudinal axis ("travel direction") of the vehicle whereas an outlet 108 of the airbox defines an outflow axis 109 which is generally orthogonal to an inflow axis of the inlet 102 and generally parallel to the travel direction of the vehicle. In order to provide sufficient clearance for tools to access the airbox (for installation and removal), the airbox in the prior art is mounted with a gap G between the airbox and the front of the fuel tank 70. In prior-art designs, this was seen as necessary because the engine and carburetor (or throttle body) are fixed and it was believed that the only way to remove the airbox from the carburetor (or throttle body) was to provide a gap G in order to longitudinally displace the airbox to disengage the tubular connection and the hose clamp from the carburetor (or throttle body).

As a result of this conventional design, the fuel tank was thus mounted further rearward to accommodate the needed gap G, causing an undesirable decentralization of mass. The fuel tank when full of fuel, as is understood by those of ordinary skill in the art, represents a very substantial mass which thus has a significant impact on the vehicle's dynamics. Particularly for snowmobiles, it is important to locate mass near the front drive axle or drive pulley. Therefore, the gap G between the airbox and the fuel tank results in suboptimal mass centralization and hence suboptimal vehicle dynamics.

Therefore, it would be highly desirable to provide an improved airbox that would overcome at least one of the deficiencies of the prior art as described above.

SUMMARY OF THE INVENTION

It is an object of the present invention to provide a sliding airbox for a land vehicle such as a snowmobile that overcomes at least one of the deficiencies of the prior art as described above.

In accordance with one aspect of the present invention, a vehicle includes a frame; an internal combustion engine mounted to the frame for propulsion of the vehicle, the engine having an air intake for conveying air into the engine; and an airbox slidingly connected to the air intake, the airbox capable of being slid orthogonally to the air intake between an operative position, in which the airbox can be secured to the air intake, and an inoperative position, in which the airbox is disengaged from the air intake of the engine.

In accordance with another aspect of the present invention, a snowmobile includes a frame including a tunnel; an engine disposed on the frame, the engine having an air intake for conveying air into the engine; a drive track disposed below and supported by the tunnel and operatively connected to the engine for propulsion of the snowmobile; two steerable skis disposed on the frame, each connected to the frame via a front suspension; a straddle seat disposed on the tunnel above the drive track and rearward of the engine; and an airbox slidingly connected to the air intake, the airbox capable of being slid orthogonally to the air intake between an operative position, in which the airbox can be secured to the air intake, and an inoperative position, in which the airbox is disengaged from the air intake of the engine.

In accordance with yet another aspect of the present invention, a sliding airbox is provided for an internal combustion engine of a vehicle, the engine having an air intake for receiving air into at least one cylinder of the engine. The airbox includes an inlet for receiving air from atmosphere; an air container for containing air received from the inlet; a slot for slidingly engaging an adapter plate of an intake adapter, the adapter plate having a hole to define an outlet of the airbox when the airbox is slid into engagement with the adapter plate, the intake adapter being secured to the air intake of the engine.

The sliding airbox can be quickly and easily displaced into and out of engagement with the air intake or air metering device (carburetor or throttle body) of the engine, which thus substantially facilitates assembly and maintenance of the vehicle. Moreover, the sliding airbox obviates the need to provide a gap between the airbox and the fuel tank. As a direct consequence, the fuel tank can be moved forward, thus improving the mass centralization of the vehicle.

Other features and advantages of the present invention will be better understood with reference to the preferred embodiment described hereinafter.

BRIEF DESCRIPTION OF THE DRAWINGS

Having thus generally described the nature of the present invention, reference will now be made to the accompanying drawings by way of illustration showing a preferred embodiment, in which:

FIGS. 7A, 7B and 7C are side, top and isometric perspective views, respectively, of an adapter plate of an intake adapter for securing the airbox in accordance with the preferred embodiment of the present invention;

DETAILED DESCRIPTION OF THE PREFERRED EMBODIMENT

Figure 4:
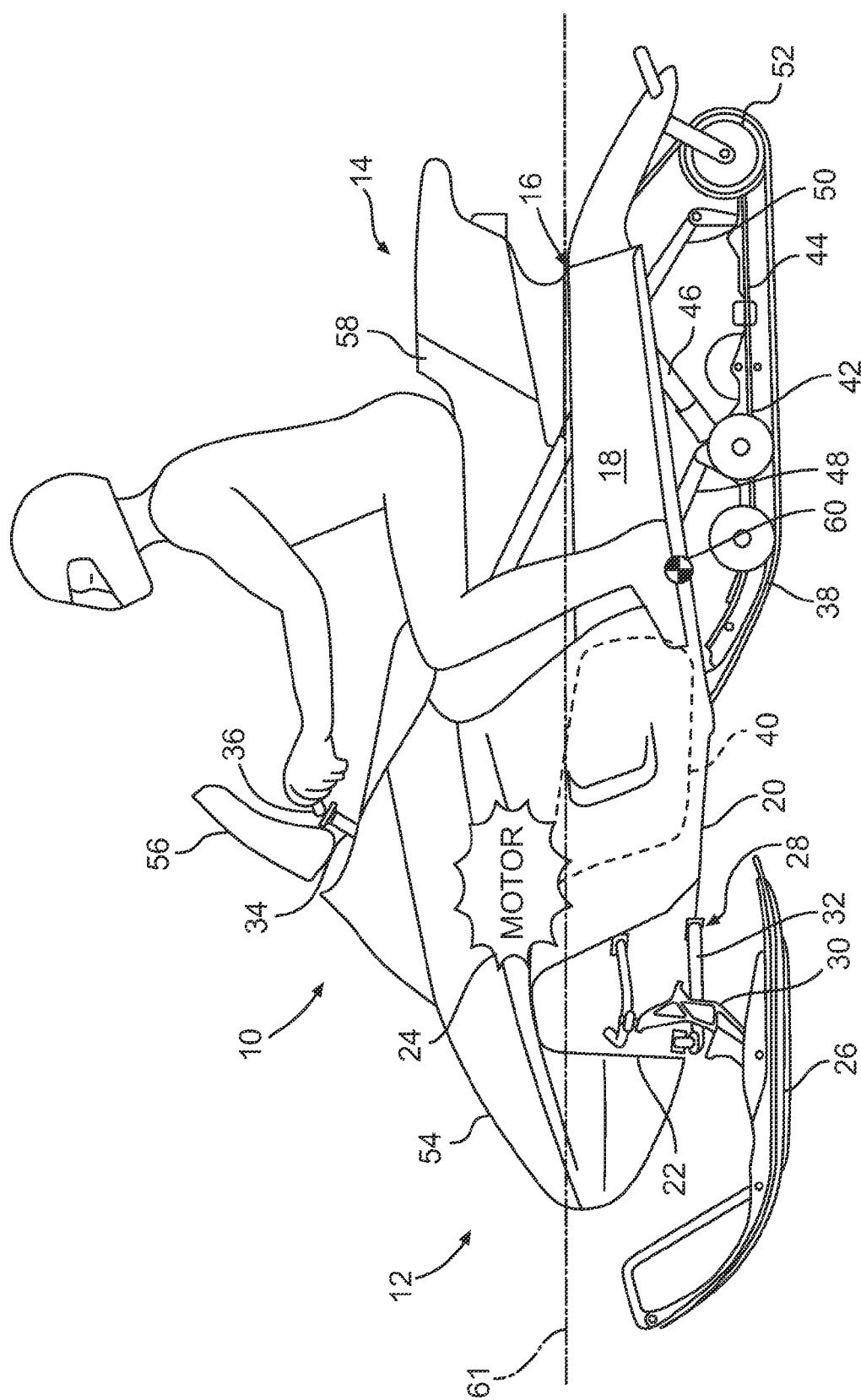
FIG. 4 is a side view of a snowmobile capable of incorporating an embodiment of the present invention.

Referring now to FIG. 4, a snowmobile capable of incorporating an embodiment of the present invention is designated generally by reference numeral 10. Although the present invention is applicable in other types of vehicles, the present invention is particularly useful in connection with snowmobiles. Therefore, while the preferred embodiments will be described with reference to a snowmobile, it should be understood that the improved airbox in accordance with the present invention could be used in other types of vehicles, particularly recreational vehicles such as all-terrain vehicles, go-karts, personal watercraft, to name but a few examples.

The snowmobile 10 includes a forward end 12 and a rearward end 14 which are defined consistently with a travel direction of the vehicle. The snowmobile 10 includes a frame or chassis 16 which normally includes a rear tunnel 18, an engine cradle portion 20 and a front suspension assembly portion 22. An engine 24, which is schematically illustrated in FIG. 4, is carried by the engine cradle portion 20 of the frame 16. A ski and steering assembly (not indicated) is provided, in which two skis 26 are positioned at the forward end 12 of the snowmobile 10 and are attached to the front suspension assembly portion 22 of the frame 16 through a front suspension assembly 28. The front suspension assembly 28 includes ski legs 30, supporting arms 32 and ball joints (not shown) for operatively joining the respective ski legs 30, supporting arms 32 and a steering column 34. The steering column 34 at its upper end is attached to a steering device such as a handlebar 36 which is positioned forward of a rider and behind the engine 24 to rotate the ski legs 30 and thus the skis 26, in order to steer the vehicle.

An endless drive track 38 is positioned at the rear end 14 of the snowmobile 10 and is disposed under tunnel 18, being connected operatively to the engine 24 through a belt transmission system 40 which is schematically illustrated by broken lines in FIG. 4. Thus, the endless drive track 38 is driven to run about a rear suspension assembly 42 for propulsion of the snowmobile 10. The rear suspension assembly 42 includes a pair of slide rails 44 in sliding contact with the endless drive track 38. The rear suspension assembly 42 also includes one or more shock absorbers 46 which may further include a coil spring (not shown) surrounding the individual shock absorbers 46. Front and rear suspension arms 48 and 50 are provided to attach the slide rails 44 to the frame (chassis) 16. One or more idler wheels 52 are also provided in the rear suspension assembly 42.

At the front end 12 of the snowmobile 10, fairings 54 enclose the engine 24 and the belt transmission system 40, thereby providing an external shell that not only protects the engine 24 and the belt transmission system 40, but can also be decorated to make the snowmobile 10 more aesthetically pleasing. Typically, the fairings 54 include a hood (not indicated) and one or more side panels which can be opened to allow access to the engine 24 and the belt transmission system 40 when this is required, for example, for inspection or maintenance of the engine 24 and/or the belt transmission system 40. In the particular snowmobile 10 shown in FIG. 4, the side panels can be opened along a vertical axis to swing away from the snowmobile 10. A windshield 56 may be connected to the fairings 54 near the front end 12 of the snowmobile 10 or directly to the handlebar 36. The windshield 56 acts as a wind screen to lessen the force of the air on the rider while the snowmobile 10 is moving.

The engine 24 is a type of internal combustion engine that is supported on the frame 16 and is located at the engine cradle portion 20. The internal construction of the engine 24 may be of any known type, however the engine 24 drives an engine output shaft (not shown) that rotates about a horizontally disposed axis that extends generally transversely to a longitudinal centerline 61 of the snowmobile 10. The engine output shaft drives the belt transmission system 40 for transmitting torque to the endless drive track 38 for propulsion of the snowmobile 10.

A straddle-type seat 58 is positioned atop the frame 16 and extends from the rear end 14 of the snowmobile 10 to the fairings 54. A rear portion of the seat 58 may include a storage compartment or can be used to accommodate a passenger seat (not indicated). Two footrests 60 are positioned on opposite sides of the snowmobile 10 below the seat 58 to accommodate the driver's feet.

Figure 1:
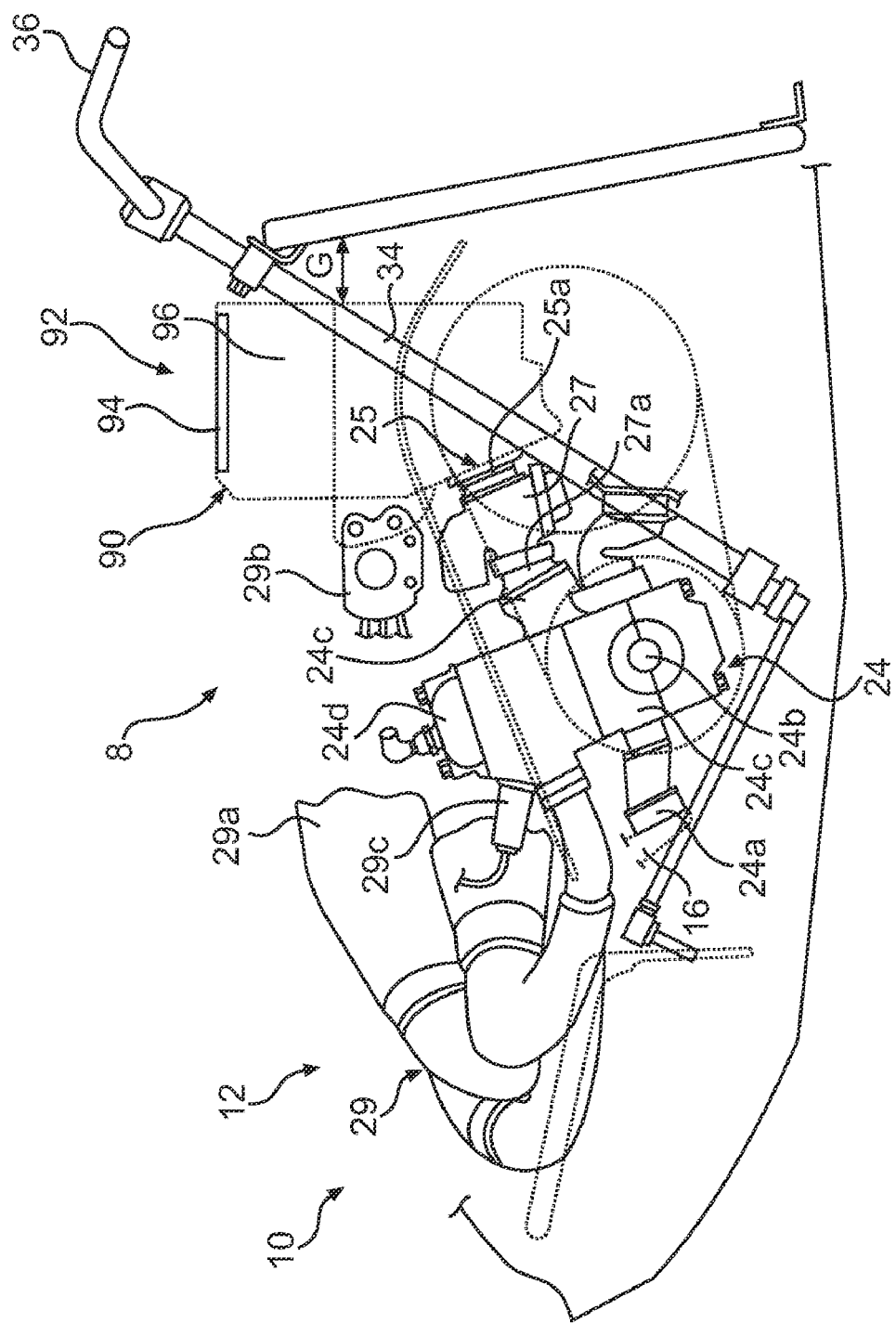
FIG. 1 is a side view of an engine compartment of a typical prior-art snowmobile showing the position of an airbox relative to the engine and carburetor.
Figure 2:
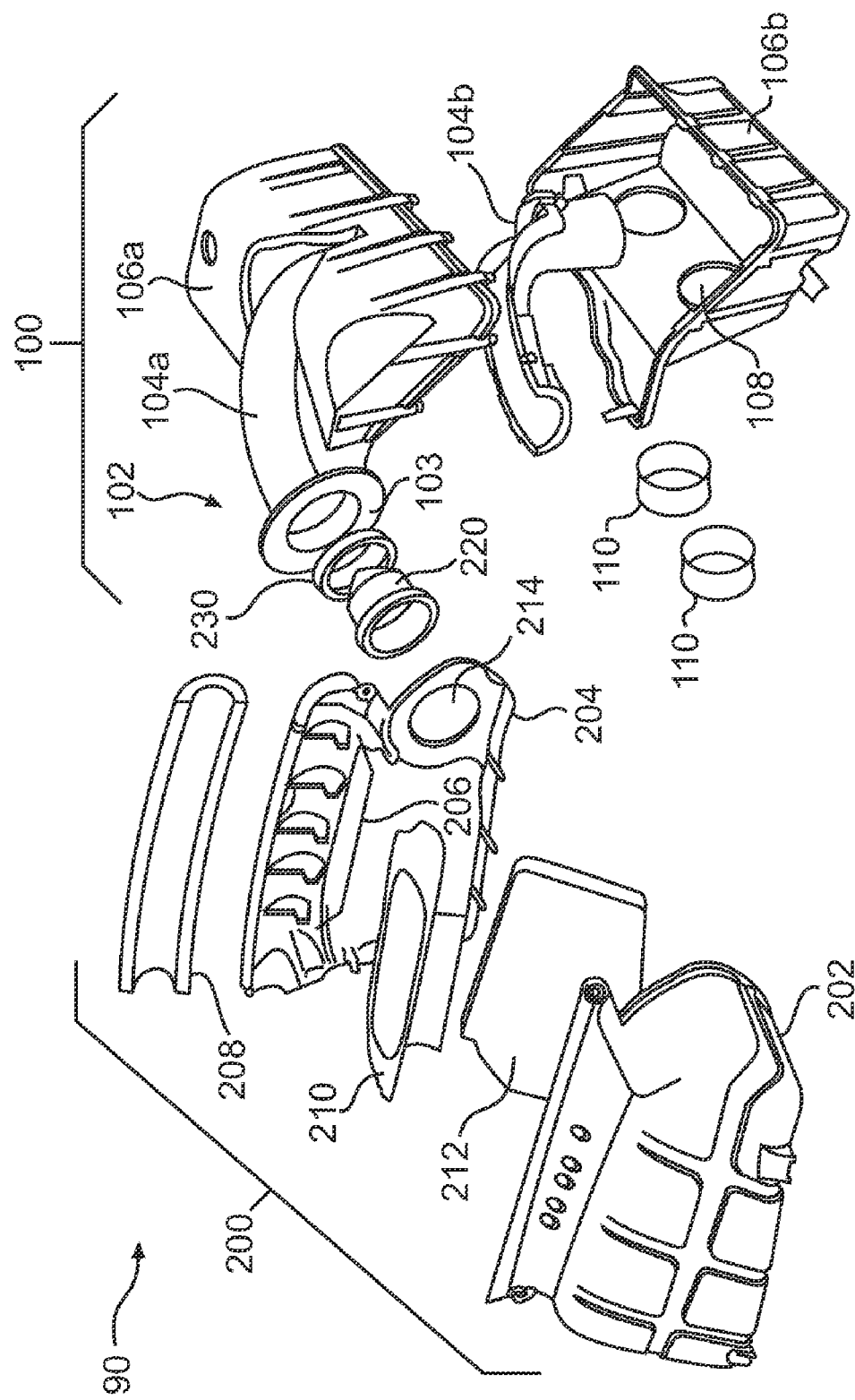
FIG. 2 is an exploded view of a prior-art airbox assembly having both primary and secondary airboxes.
Figure 3:
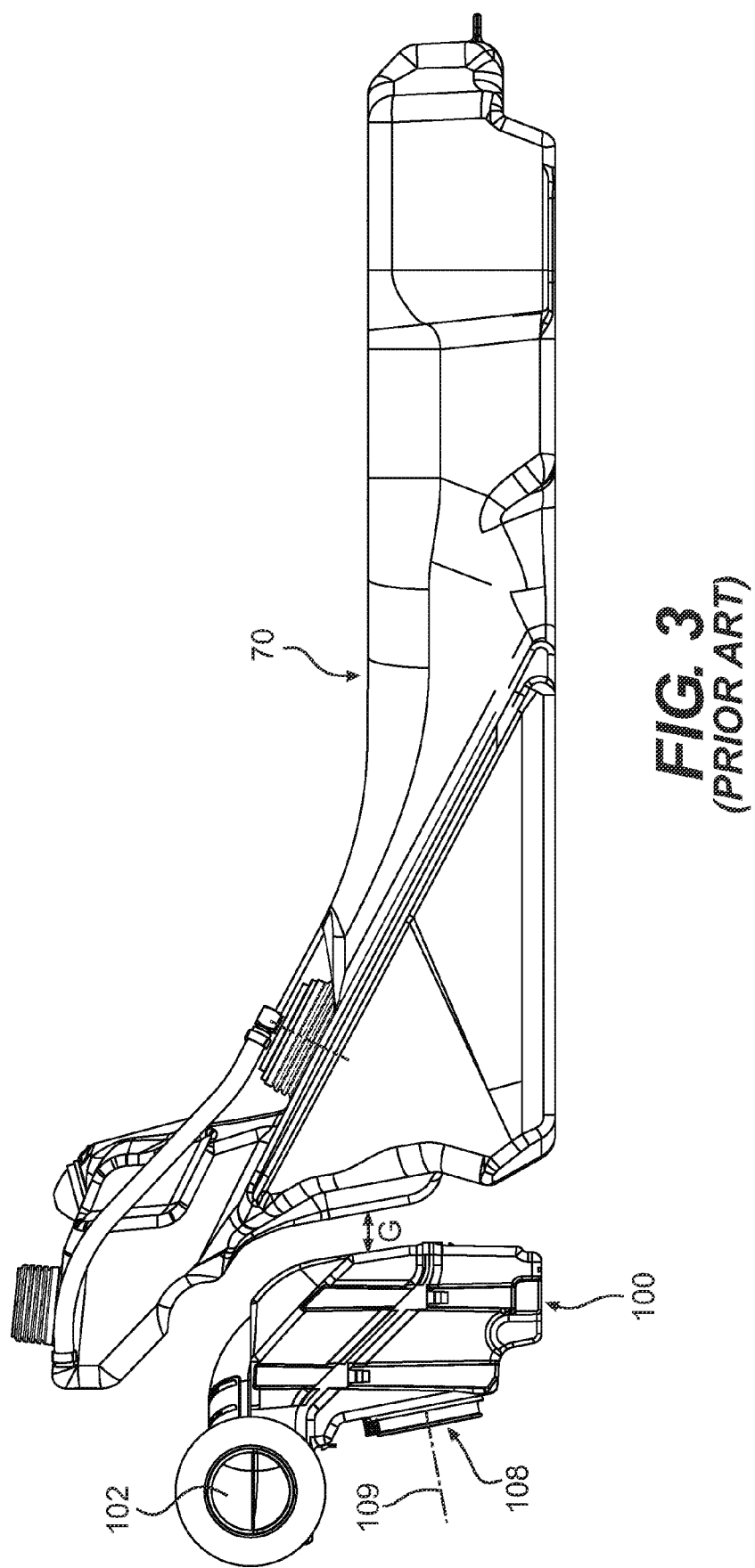
FIG. 3 is a side view of the position of the primary airbox relative to the fuel tank in a prior-art snowmobile.
Figure 5:
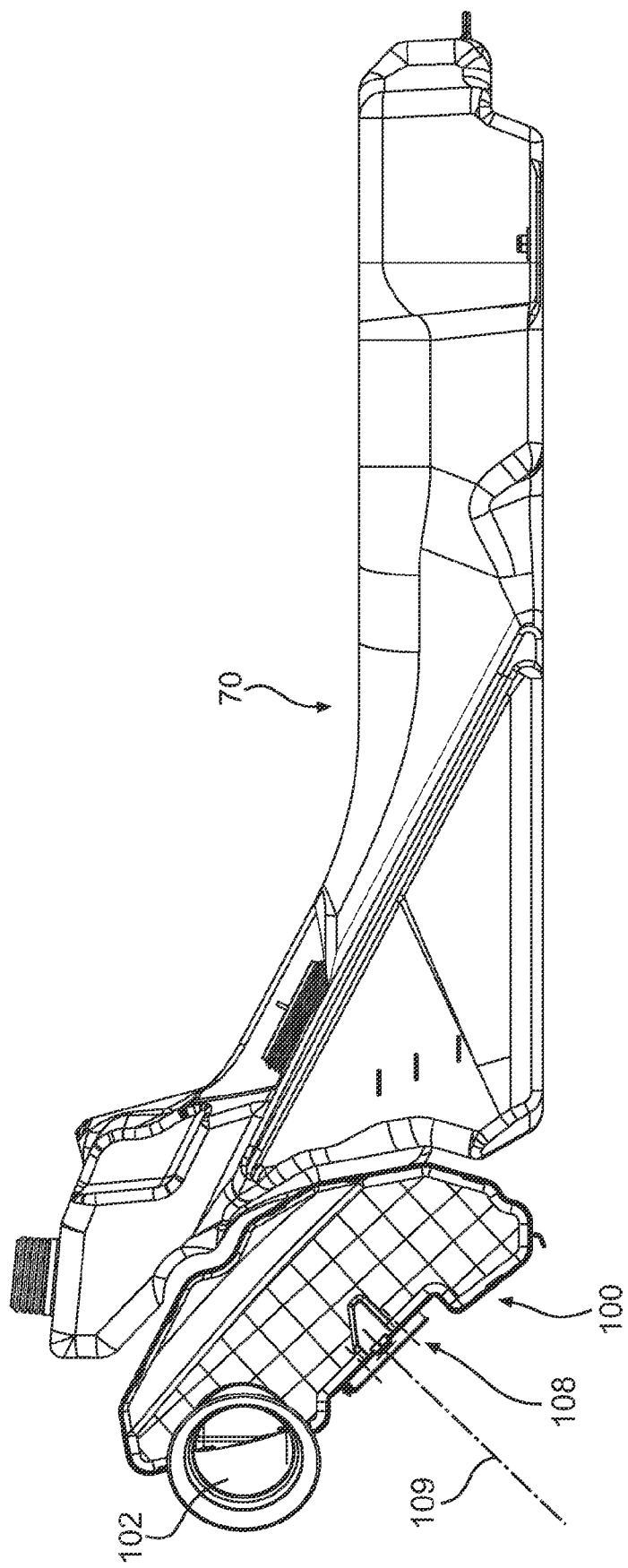
FIG. 5 is a side view of the improved position relative to the fuel tank of an airbox in accordance with an embodiment of the present invention.

In the preferred embodiment, as shown in FIG. 5 and in the subsequent figures, the snowmobile incorporates an improved (primary) airbox 100 which, due to the novel design of the airbox (to be described in detail below) allows the airbox to be secured in close proximity to the fuel tank 70, thus virtually eliminating or at least greatly reducing the gap G between the airbox and the fuel tank. Effectively, this improved airbox allows the fuel tank to be moved forward, resulting in better mass centralization for the vehicle (and consequently better overall vehicle dynamics). As shown in FIG. 5, the airbox in accordance with the preferred embodiment of the present invention is still substantially oriented the same way as the prior-art airbox shown in FIG. 3, i.e. with the inlet 102 transverse to the longitudinal axis ("travel direction") of the vehicle and the outlet 108 mainly aligned with the longitudinal axis of the vehicle. However, as will be appreciated by those of ordinary skill in the art, the air inlet could also be oriented in a number of different directions, e.g. pointing to the other side of the vehicle or pointing upwardly.

In the preferred embodiment, the sliding airbox 100 slides laterally between the engine and the fuel tank. In other words, the sliding airbox preferably slides transversely to the longitudinal axis ("travel direction") of the vehicle. Defined alternatively, the airbox slides orthogonally to the outflow axis 109 (which is generally parallel to an inflow axis of an attached carburetor or throttle body). In other words, the airbox slides perpendicularly to the axes of both the outlet of the airbox and the inlet of the carburetor/throttle body, as well as to the travel direction of the vehicle. However, as will be appreciated by those of ordinary skill in the art, the engine compartment could be reconfigured to accommodate a sliding airbox that slides about a different axis, e.g. vertically or diagonally.

Figure 6:
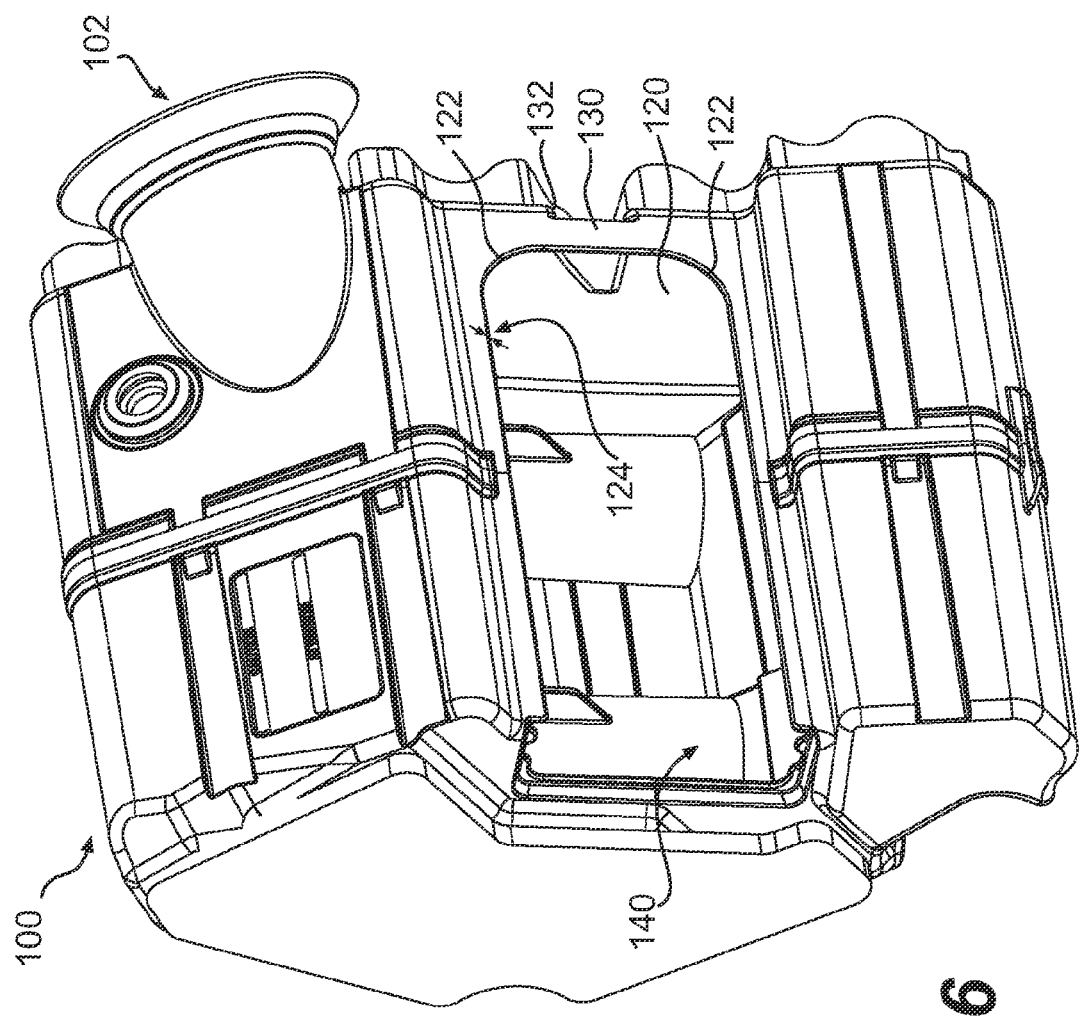
FIG. 6 is an isometric perspective view of an airbox in accordance with a preferred embodiment of the present invention, shown without the adapter plate.

FIG. 6 is an isometric perspective view of the airbox 100 in accordance with the preferred embodiment of the present invention. The inlet 102 is in fluid communication with a generally rectangular or a sideways U-shaped slot 120 molded into the airbox 100. Preferably, the generally rectangular slot 120 is molded with rounded corners 122 so that the slot is a sideways U-shaped aperture having a thin wall 124. The airbox, as is known by those of ordinary skill in the art, is typically molded from a strong but lightweight plastic or other suitable polymer. The molding of such a slot is well within the technical scope of those of ordinary skill in the art of plastic component fabrication and thus will not be described in any further detail.

As illustrated in FIG. 6, the airbox further includes a thin-walled abutment 130 and a notch 132, the functionality of which will become apparent below. The airbox 100 also includes a side face aperture 140. The slot, abutment, notch and thin wall of the airbox are collectively designed to mate with a corresponding adapter plate 300 shown in FIGS. 7A, 7B and 7C. The adapter plate 300 is shaped and dimensioned to slidingly receive the thin wall of the airbox. In other words, the adapter plate 300 (which is immobilized relative to the engine as will be described below) is a generally rectangular or sideways U-shaped plate having rounded corners 310 for smoothly sliding relative to the slot 120 and for abutting the abutment 130 of the airbox. A releasable connector 320, e.g. a quick-release depressible clip, detachably secures the plate to the abutment of the airbox 130 by hooking into the notch 132. The adapter plate 300 has a pair of peripheral lips 332, 334 which form a groove 142 therebetween, to slidingly accept the thin wall 124 of the airbox. The adapter plate includes a backing 336 which covers the side face aperture 140. The adapter plate 300 thus partially encloses the slot 120, except for a pair of circular holes in the plate which define outlet ports 340, 342 for allowing air to exit the airbox.

Figure 8:
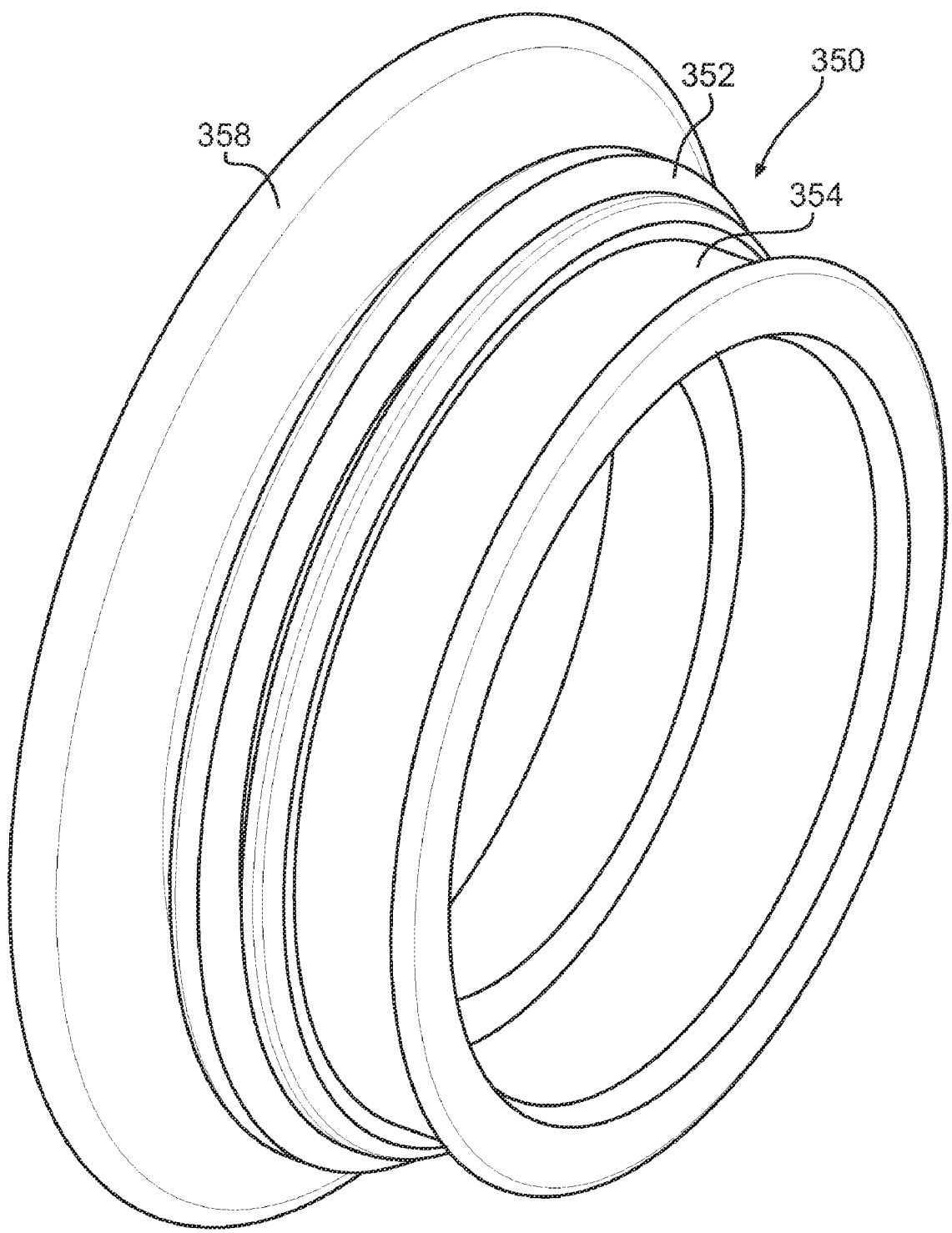
FIG. 8 is an isometric perspective view of a flexible tubular connection for mounting to each of the outlets of the adapter plate to define an intake adapter for use in detachably securing the airbox.
Figure 9:
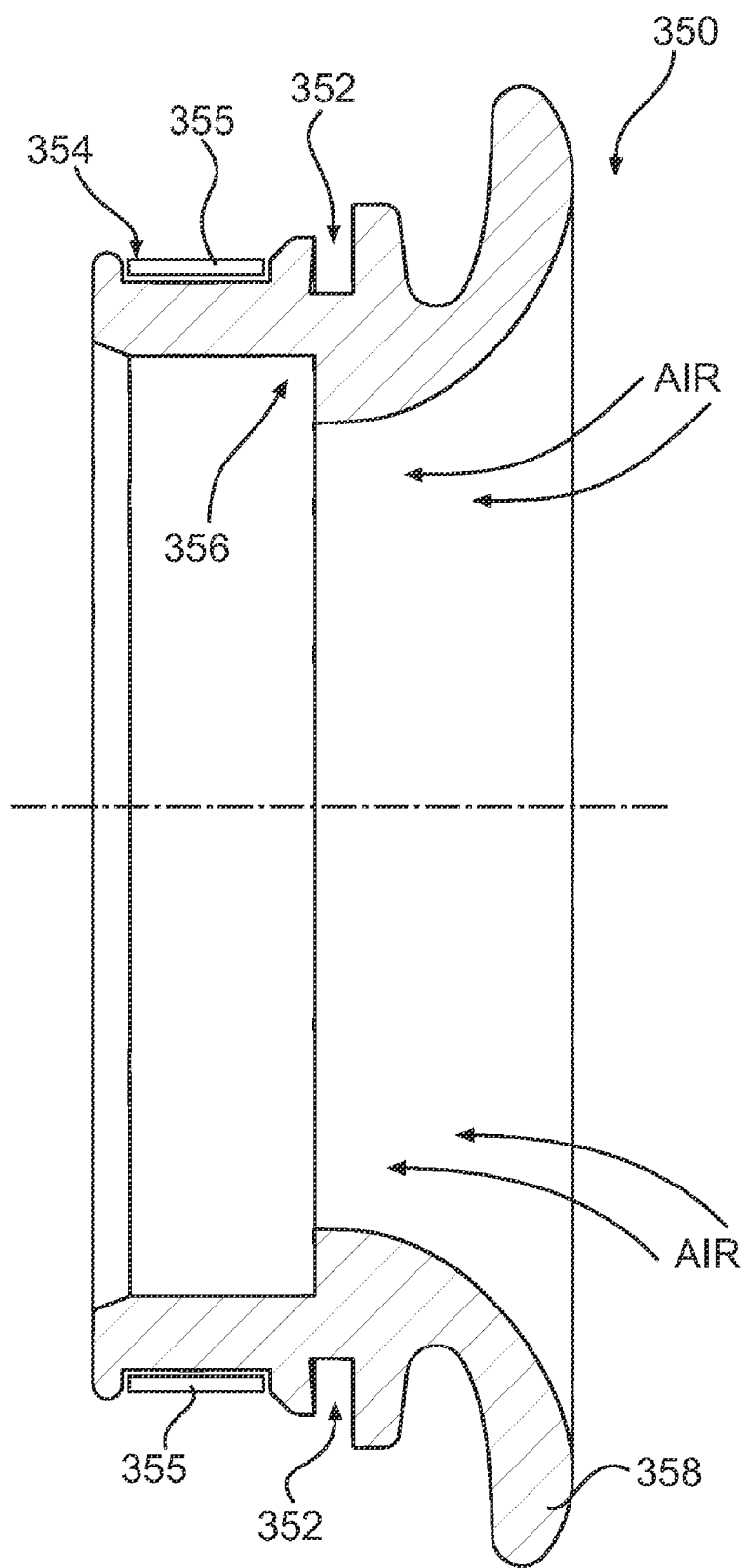
FIG. 9 is a cross-sectional view of the flexible tubular connection of FIG. 8.

Each of the outlet ports 340, 342 of the adapter plate 300 receives a flexible tubular connection 350, such as the one shown in FIGS. 8 and 9. Together, the adapter plate and flexible tubular connection(s) shall be referred to herein as an "intake adapter" as this subassembly provides a connection between the sliding airbox 100 and the air intake of the engine. For the purporses of this specification, "air intake" means the air inlet to the engine and is meant to include an air metering device such as a carburetor or a throttle body which may be interfaced between the airbox and the engine.

As shown in FIGS. 8 and 9, the flexible tubular connection 350 is an annular body made preferably of rubber or other elastomeric substance. The flexible tubular connection 350 has a first circumferential groove 352 for mounting each of the flexible tubular connections 350 to the outlet ports 340, 342 of the adapter plate 300. Each flexible tubular connection 350 has a second circumferential groove 354 for receiving a hose clamp 355 that detachably secures the flexible tubular connection 350 to the air metering device (e.g. carburetor or throttle body) to provide an airtight connection between the flexible tubular connection and the air metering device (e.g. carburetor or throttle body). The flexible tubular connection also includes an inner annular shoulder 356 against which the intake of the air metering device is seated prior to tightening the hose clamp 355. The flexible tubular connection 350 also includes an inner lip 358 which helps to funnel air into the air metering device.

Figure 10:
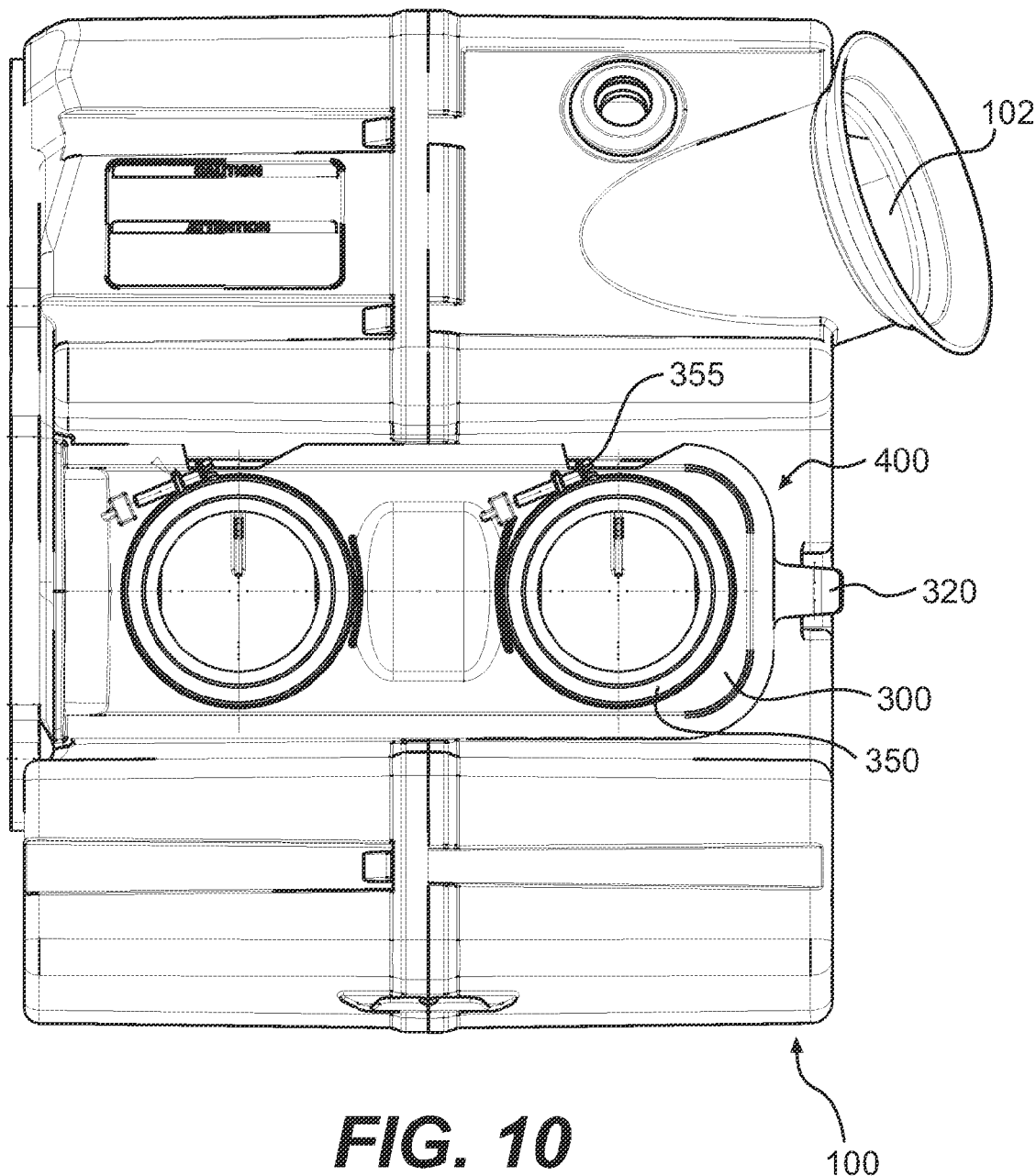
FIG. 10 is a front view of the airbox in accordance with the preferred embodiment of the present invention, shown connected to the intake adapter.

FIG. 10 is a front view of the airbox 100 in accordance with the preferred embodiment of the present invention, shown connected to an intake adapter 400 which, as explained earlier, includes the adapter plate 300 and a pair of flexible tubular connections 350, i.e. one for each of the outlet ports of the adapter plate. The number of outlet ports (and hence the number of flexible tubular connections) will, of course, vary depending on the number of cylinders in the engine.

FIG. 10 shows the sliding airbox 100 fully mounted to the adapter plate 300 of the intake adapter 400. The releasable connector 320 locks the airbox 100 to the adapter plate 300 as shown. Furthermore, the hose clamps 355 detachably secure the flexible tubular connections 350 to the air intakes of the engine (not shown). Air is thus able to flow into the air inlet 102 and out of the outlet ports and flexible tubular connections into the air intakes of the engine, optionally via an air metering device such as carburetors or throttle bodies.

Figure 11:
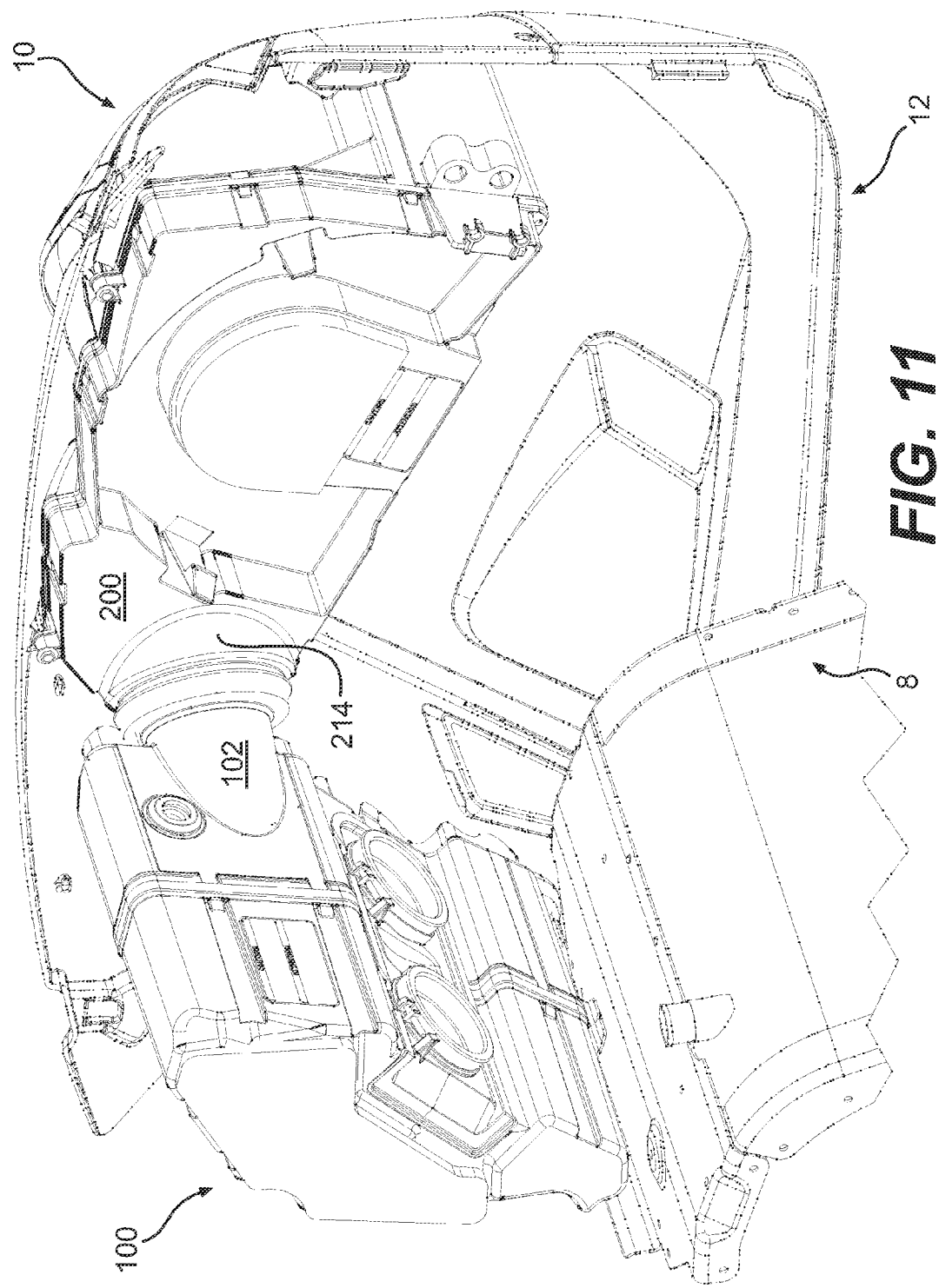
FIG. 11 is an isometric perspective view of the airbox secured in an operative position in the engine compartment in accordance with the preferred embodiment of the present invention.

FIG. 11 shows the sliding airbox. 100 positioned within the engine compartment 8 of the forward end 12 of the snowmobile 10. The air inlet 102 of the sliding (primary) airbox 100 is connected to the outlet 214 of the secondary airbox 200.

In operation, prior to installing the airbox, the first step is to affix the intake adapter 400 to the air intake(s) of the engine, or alternatively to the air metering devices (carburetors or throttle bodies) that regulate air flow into the air intake(s) of the engine. Prior to securing the intake adapter 400, the flexible tubular connections 350 are installed in each of the outlet ports 340, 342 of the adapter plate 300. The flexible tubular connections 350 are then flexibly secured to the air intake(s) using hose clamps 355. The intake adapter 400 thus becomes flexibly mounted to the air intake(s) of the engine and ready to slidably receive the sliding airbox 100. The sliding airbox 100 is then slid into engagement with the intake adapter 400 by aligning the thin wall 124 of the airbox with the groove 142 of the adapter plate 300. The slot 120 of the sliding airbox 100 is thus slid over the adapter plate 300 until the abutment 130 abuts the adapter plate 300 and the releasable connector 320 is clicked into locking engagement with the notch 132 in the abutment 130. When the releasable connector is engaged, the backing 336 will have slid flush with the side face of the airbox. In the operative position, air flows into the airbox through the inlet 102 (i.e. from the secondary airbox 200) and then exits the airbox through the outlet ports 340, 342 and their respective flexible tubular connections 350, which thus convey air into the air intake(s) of the engine.

To remove the sliding airbox for servicing of the engine or of the airbox itself, the releasable connector 320 is disengaged (for example, a depressible clip can be depressed to free the clip from the notch) to displace the airbox from the operative position to an inoperative or disengaged position. The airbox can then be slid off the adapter plate. The slot-to-plate sliding connection thus greatly facilitates both installation and removal of the airbox. Accordingly, the time and cost of assembly and maintenance are diminished. Furthermore, as noted earlier, the sliding airbox can be located in close proximity to the fuel tank, virtually eliminating or at least greatly reducing the gap G between the airbox and the fuel tank. Accordingly, the fuel tank can be moved forwardly to improve the mass centralization of the vehicle. Alternatively, the volume of the airbox can be increased for improved engine performance.

Modifications and improvements to the above-described embodiment of the present invention may become apparent to those skilled in the art. The foregoing description is intended to be exemplary rather than limiting. The scope of the present invention is therefore intended to be limited solely by the scope of the appended claims.

We claim:

1. A vehicle comprising:
   a frame;
   an internal combustion engine mounted to the frame for propulsion of the vehicle, the engine having an air intake system for conveying air into the engine; and
   an airbox, the airbox having an outlet in fluid communication with the air intake system, the outlet defining a vector along which the air travels to enter the air intake system,
   the airbox being slidably engageable with the air intake system by sliding the airbox in a direction substantially perpendicular to the vector into engagement with the air intake system.

2. The vehicle as claimed in claim 1 further comprising an intake adapter detachably secured to the air intake system, the intake adapter having an adapter plate for sliding connection with a complementarily shaped slot in the airbox, the adapter plate having a hole permitting air to flow from the airbox into the air intake system of the engine.

3. The vehicle as claimed in claim 2 wherein the intake adapter comprises a flexible tubular connection for detachably securing the intake adapter to the air intake system of the engine.

4. The vehicle as claimed in claim 1 wherein the air intake system has an air intake axis, and the direction is orthogonal to the air intake axis.

5. The vehicle as claimed in claim 2 wherein the adapter plate comprises a releasable connector for detachably securing the adapter plate to the airbox when the airbox is engaged with the air intake system.

6. The vehicle as claimed in claim 1 wherein the airbox slides between the engine and a fuel tank mounted to the frame rearward of the engine.

7. The vehicle as claimed in claim 1 wherein the airbox is slidably engageable in a direction transverse to a longitudinal axis of the vehicle.

8. The vehicle as claimed in claim 1 wherein the airbox is slidably engageable in a direction perpendicular to a longitudinal axis of the vehicle.

9. A snowmobile comprising:
   a frame including a tunnel;
   an engine disposed on the frame, the engine having an air intake system for conveying air into the engine;
   a drive track disposed below and supported by the tunnel and operatively connected to the engine for propulsion of the snowmobile;
   two steerable skis disposed on the frame, each connected to the frame via a front suspension;
   a straddle seat disposed on the tunnel above the drive track and rearward of the engine; and
   an airbox, the airbox having an outlet in fluid communication with the air intake system, the outlet defining a vector along which the air travels to enter the air intake system,
   the airbox being slidably engageable with the air intake system by sliding the airbox in a direction substantially perpendicular to the vector into engagement with the air intake system.

10. The snowmobile as claimed in claim 9 further comprising an intake adapter detachably secured to the air intake system, the intake adapter having an adapter plate for sliding connection with a complementarily shaped slot in the airbox, the adapter plate having a hole permitting air to flow from the airbox into the air intake system of the engine.

11. The snowmobile as claimed in claim 10 wherein the intake adapter comprises a flexible tubular connection for detachably securing the intake adapter to the air intake system of the engine.

12. The snowmobile as claimed in claim 9 wherein the air intake system has an air intake axis, and the direction is orthogonal to the air intake axis.

13. The snowmobile as claimed in claim 10 wherein the adapter plate comprises a releasable connector for detachably securing the adapter plate to the airbox when the airbox is engaged with the air intake system.

14. The snowmobile as claimed in claim 9 wherein the airbox slides between the engine and a fuel tank mounted to the frame rearward of the engine.

15. The snowmobile as claimed in claim 9 wherein the airbox is slidably engageable in a direction transverse to a longitudinal axis of the snowmobile.

16. The snowmobile as claimed in claim 9 wherein the airbox is slidably engageable in a direction perpendicular to a longitudinal axis of the snowmobile.

17. A sliding airbox for an internal combustion engine of a vehicle, the engine having an air intake for receiving air into at least one cylinder of the engine, the airbox comprising:
   an inlet for receiving air from atmosphere;
   an air container for containing air received from the inlet;
   a slot for slidingly engaging an adapter plate of an intake adapter by sliding the airbox into engagement with the air intake in a direction substantially perpendicular to a vector along which the air travels to enter the air intake, the adapter plate having a hole to define an outlet of the airbox when the airbox is slid into engagement with the adapter plate, the intake adapter being secured to the air intake of the engine.

18. The airbox as claimed in claim 17 wherein the intake adapter comprises at least one flexible tubular connection for connecting the intake adapter to the air intake of the engine.

19. The airbox as claimed in claim 17 wherein the slot in the airbox is rectangular for engaging a correspondingly rectangular adapter plate.

20. The airbox as claimed in claim 17 wherein the intake adapter comprises a releasable connector for detachably securing the adapter plate to the airbox when the airbox is in the operative position.

* * * * *